United States Patent
Hobson et al.

(10) Patent No.: US 7,480,790 B2
(45) Date of Patent: Jan. 20, 2009

(54) SLEEP STATE RESUME

(75) Inventors: Louis B. Hobson, Tomball, TX (US); Robert Volentine, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 11/192,805

(22) Filed: Jul. 29, 2005

(65) Prior Publication Data

US 2007/0028080 A1 Feb. 1, 2007

(51) Int. Cl.
*G06F 9/00* (2006.01)
*G06F 15/177* (2006.01)

(52) U.S. Cl. .................. 713/1; 713/2; 713/100

(58) Field of Classification Search ........... 713/1
See application file for complete search history.

(56) References Cited

U.S. PATENT DOCUMENTS

| | | | |
|---|---|---|---|
| 6,360,327 B1 | 3/2002 | Hobson | |
| 6,499,102 B1 | 12/2002 | Ewertz | |
| 6,584,573 B1 | 6/2003 | Wunderlich | |
| 6,611,883 B1 * | 8/2003 | Avery | 710/22 |
| 6,725,384 B1 | 4/2004 | Lambino | |
| 6,954,879 B1 * | 10/2005 | Tobias et al. | 714/30 |
| 2004/0073818 A1 * | 4/2004 | Cheok et al. | 713/300 |
| 2005/0060470 A1 | 3/2005 | Main | |
| 2005/0071692 A1 | 3/2005 | Chaiken | |
| 2005/0102454 A1 | 5/2005 | McAfee | |

* cited by examiner

*Primary Examiner*—Thuan N Du
*Assistant Examiner*—Michael J Brown (57) ABSTRACT

In one embodiment a method comprises collecting device configuration information during an initialization process in a computing device, storing the device configuration in a memory buffer, and using the device configuration information to restore the computing device from a low-power mode to an operational mode.

12 Claims, 5 Drawing Sheets

SLEEP STATE RESUME

TECHNICAL FIELD

This application relates to electronic computing, and more particularly to resuming from a sleep state in a computing system.

BACKGROUND

Advanced Control and Power Interface (ACPI) is a specification that makes hardware status information available to an operating system in computers, including laptops, desktop, servers, etc. More information about ACPI may be found in the Advanced Configuration and Power Interface Specification, Revision 2.0a, Mar. 31, 2002, cooperatively defined by Compaq Computer Corporation, Intel Corporation, Microsoft Corporation, Phoenix Technologies Ltd., and Toshiba Corporation. The ACPI specification was developed to establish industry common interfaces enabling robust operating system (OS)-directed motherboard device configuration and power management of both devices and entire systems. ACPI is the key element in operating system-directed configuration and power management (OSPM).

ACPI is used in personal computers (PCs) running a variety of operating systems, such as Windows® available from Microsoft Corporation, Linux, available as open source form a variety of vendors, and HP-UX, available from Hewlett-Packard Company. ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

ACPI implements both static and interpretable tables. At boot-up time, the system firmware (typically the BIOS, or Basic Input/Output System) constructs the static tables, which are consumed by the operating system. The interpretable tables include ACPI Machine Language (AML), which is compiled and then merged into the system firmware. The operating system reads the AML from the interpretable tables and executes the architected interfaces, using an ACPI interpreter. In this fashion, the operating system manipulates hardware resources.

Among other things, ACPI implements low-power usage modes referred to as sleep states. One advantage of sleep states is that some system context information remains stored in memory during the sleep state, which reduces the time required to restore the computing system to an operational state.

SUMMARY

In one embodiment a method comprises collecting device configuration information during an initialization process in a computing device, storing the device configuration in a memory buffer, and using the device configuration information to restore the computing device from a low-power mode to an operational mode.

DETAILED DESCRIPTION

Described herein are exemplary system and methods for resuming from an S3 sleep state in a computing system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
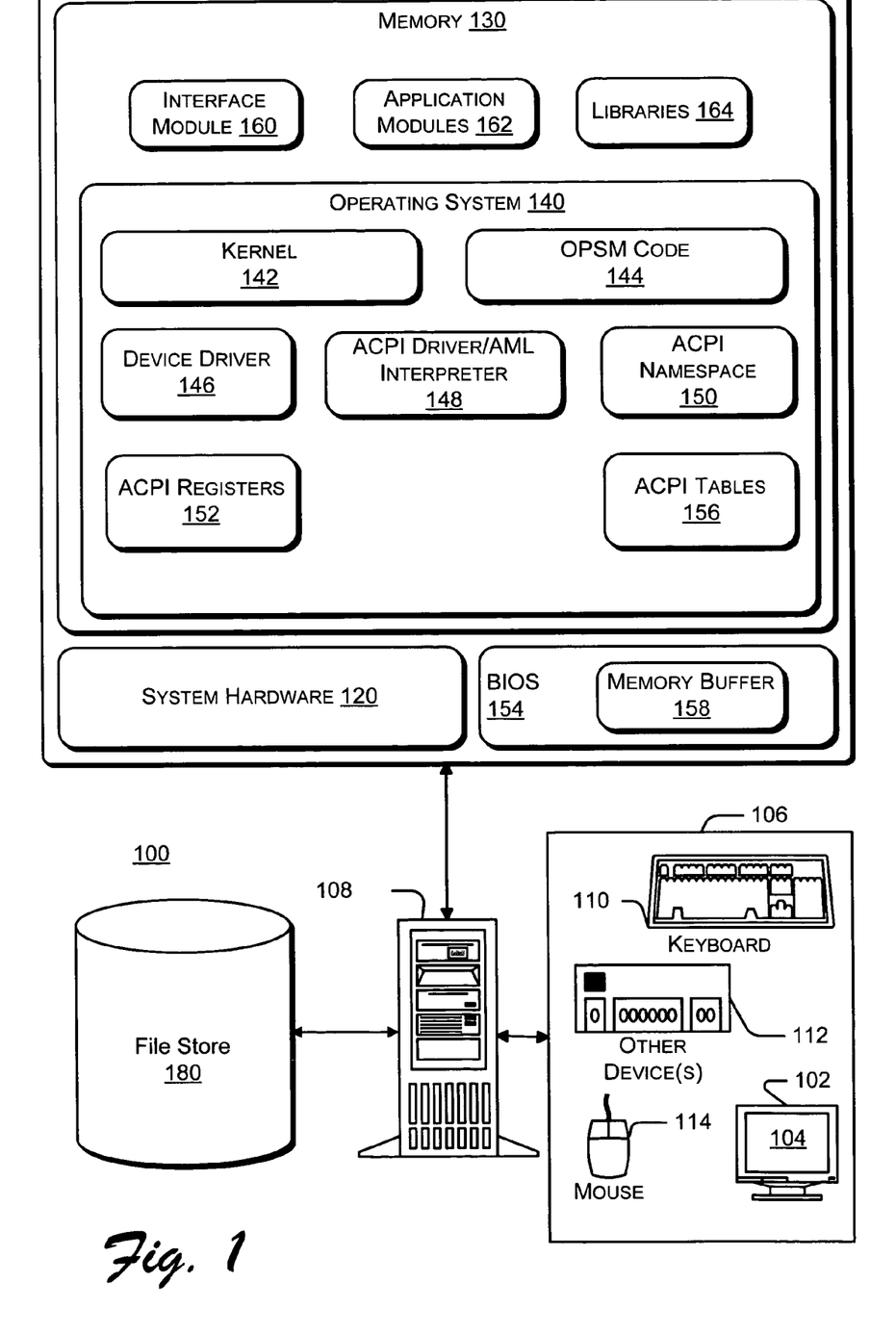
FIG. 1 is a schematic illustration of one embodiment of an ACPI table management system.

FIG. 1 is a schematic illustration of an exemplary computer system 100 adapted to implement ACPI. The computer system 100 includes a computer 108 and one or more accompanying input/output devices 106 including a display 102 having a screen 104, a keyboard 110, other I/O device(s) 112, and a mouse 114. The other device(s) 112 can include a touch screen, a voice-activated input device, a track ball, and any other device that allows the system 100 to receive input from a developer and/or a user. The computer 108 includes system hardware 120 and random access memory and/or read-only memory 130. A file store 180 is communicatively connected to computer 108. File store 180 may be internal such as, e.g., one or more hard drives, or external such as, e.g., one or more external hard drives, network attached storage, or a separate storage network.

The particular embodiment of operating system 140 is not critical to the subject matter described herein. Operating system 140 may be embodied as a UNIX operating system or any derivative thereof (e.g., Linux, Solaris, etc.) or as a Windows® brand operating system.

Computing system 100 further includes a number of components to implement ACPI operations. Although the subject matter is described with reference to resuming from an ACPI S3 power state, there is no intention to limit the claims to ACPI configuration systems. Rather, the subject matter describe herein may operate with and provide benefits with any operating system, architecture, and/or power configuration management system.

Memory 130 includes an operating system 140 for managing operations of computer 108. In operation, one or more application modules 162 and/or libraries 164 executing on computer 108 make calls to the operating system 140 to execute one or more commands on the computer's processor. The operating system 140, in turn, invokes the services of system hardware 120 to execute the command(s). The operating system kernel 142 can be generally considered as one or more software modules that are responsible for performing many operating system functions.

The various device drivers 146 interface with and generally control the hardware installed in the computer system 100. ACPI Driver/AML Interpreter 148 is a software module loaded during system start-up, which functions as an interface between the operating system 140 and an ACPI-compatible BIOS 154. ACPI Driver/AML Interpreter 148 populates an ACPI namespace 150 at system startup, loads description blocks from the system BIOS ACPI namespace at run time, handles certain general purpose events triggered by ACPI hardware, and passes other general purpose events to modules registered to handle those events, and the like.

A driver communicates with other drivers and the operating system components (e.g., an I/O manager or the kernel 142), for example in the Windows® 2000 operating system, by passing messages called I/O request packets (IRPs) up and down a "driver stack." As will be understood by those skilled in the art, drivers for a particular hardware device may be "stacked" such that messages directed either down to the hardware device or back up to the operating system (or other program module) are passed through a chain of drivers in a driver stack before reaching their destination. An ACPI driver 148 may be inserted into a driver stack to add functionality to the hardware device.

In one embodiment, the ACPI driver 148 creates a filter Device Object (filter DO) or a Physical Device Object (PDO) in the driver stack for each device described in an ACPI namespace 150. If the device is capable of being enumerated by an element of another subsystem, such as a Plug-n-Play subsystem, that element of the other subsystem may create the PDO for the device and the ACPI driver 148 may put a filter DO on top of the PDO. The operating system 140 provides power management features to the device stack by means of these device objects.

In one embodiment, the kernel 142 interfaces with Operating System Power Management (OSPM) system code 144. The OSPM system code 144 comprises one or more software modules that may be a part of the operating system 105 and that may be used to modify the behavior of certain components of the computer system 100, typically to mange power consumption in accordance with pre-configured power conservation settings.

In one embodiment, OSPM system code 144 may implement ACPI power management protocols to transition the computer system 100, or devices connected to the computer system 100, between power management states. The ACPI specification defines multiple power management states in which the computer system 100, the computer processor, or various devices connected to the computer system 100 may reside. Global system power states include: G3 (Mechanical Off), G2 (Soft Off), G1 (Sleeping) and G0 (Working). Device power states include: D3 (Off), DO (Fully On) and D1 and D2, which are device-dependent states. Processor power states include: C0 (Instruction state), C1 (Low Latency), C2 and C3, which are power saving states. Sleeping states include: S1 (Hardware maintains system context), S2 (CPU and system cache context lost), S3 (CPU, system cache, and chipset context lost), and S4 (only platform context is maintained), and S5, which requires a complete re-boot of the system. Particular details about various ACPI power management states are described in the ACIP specification, and are beyond the scope of this disclosure.

The ACPI-compatible BIOS 154 refers to the portion of system BIOS firmware that is compatible with the ACPI specification. The BIOS 154 manages the boot-up process for the computing system 100 the machine and implements interfaces for power and configuration operations, such as, e.g., sleep, wake, and some restart operations. BIOS 154 may include a memory buffer 158. BIOS 154 also contains definition blocks used to construct ACPI Tables 156 such as, e.g., the DSDT and the SSDT.

The ACPI Tables 156 include a Root System Description Table (RSDT), a Differentiated System Description Table (DSDT) and one or more Secondary System Description Tables (SSDTs). These tables are described in greater detail below.

Figure 2:
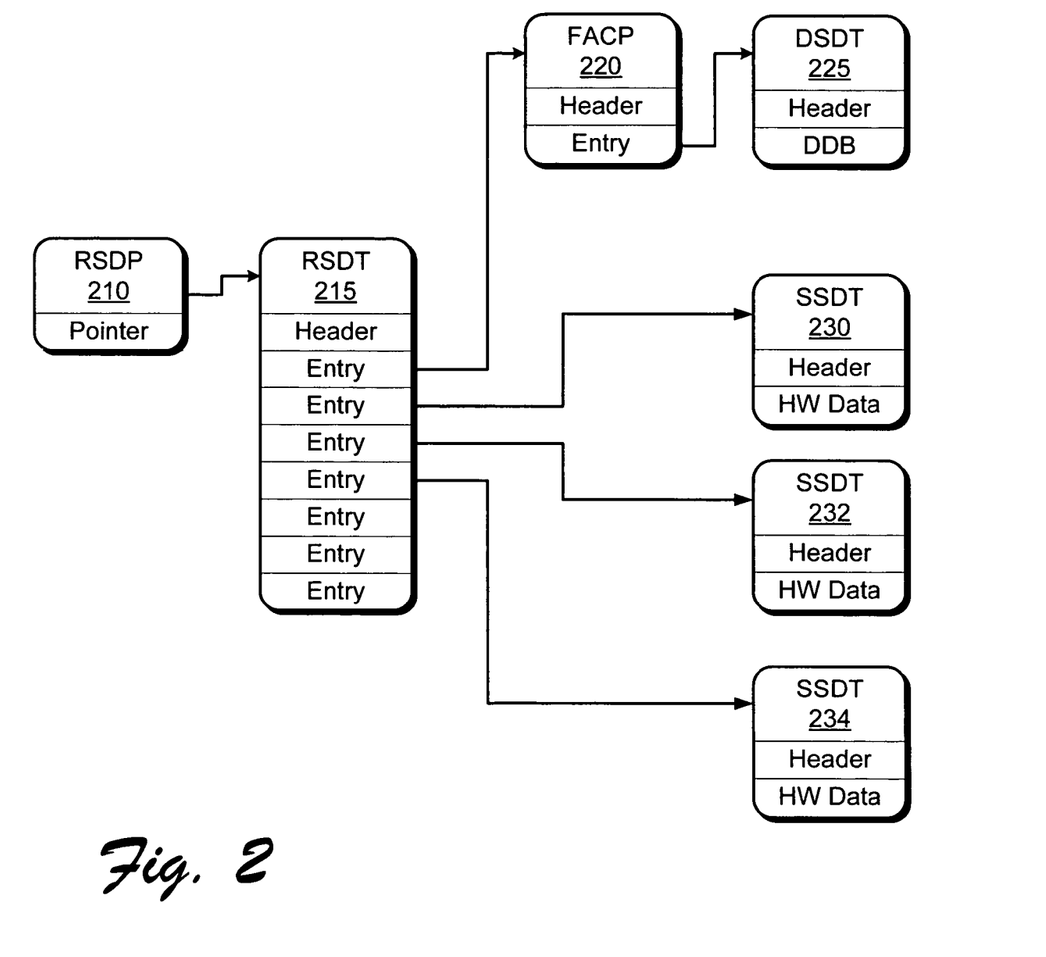
FIG. 2 is a schematic illustration of one embodiment of ACPI description tables.

FIG. 2 is a schematic illustration of ACPI description tables, which may be stored in the memory of a computing system such as the computing system 100 illustrated in FIG. 1. Referring to FIG. 2, a Root System Description Pointer (RSDP) structure 210 is established by the BIOS 158 in system memory. The RSDP 210 includes a header and a pointer to the RSDT 215.

RSDT 215 includes a header and a plurality of entries including a reference (e.g., a pointer) to the Fixed ACPI Description Table (FACP) 220. The FACP 220 includes information used for power management and information that describes details of ACPI hardware registers. The FACP references the DSDT 225.

DSDT 225 includes a header and a differentiated definition block (DDB) that includes implementation and configuration information the operating system can use to perform power management, thermal management, or plug-and-play functionality of the base computer system. Other definition blocks may be provided to describe additional hardware devices.

The RSDT 215 also references one or more SSDTs 230-234. Each SSDT 230-234 includes a header that contains information about what the block contains. Each SSDT also includes a hardware data block that provides a description of hardware components in addition to the base computer system. Other definition blocks may be provided to describe additional ACPI devices.

During recovery form an S2 or S3 sleep state, control starts from the processor's reset vector. Hence, while the subject matter of this application is described with reference to an S3 sleep state, the subject matter is equally applicable to an S2 state, or another sleep state in which some, but not all, context information may be maintained in memory.

Figure 3:
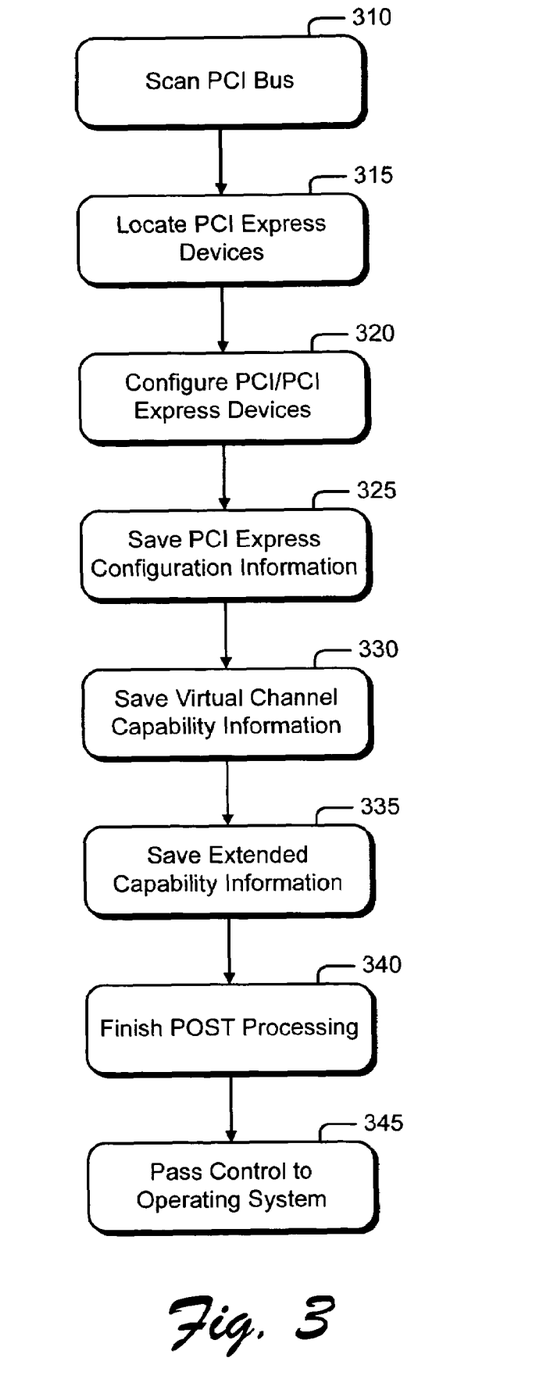
FIG. 3 is a flowchart illustrating operations in one embodiment of a method to initialize a memory buffer with ACPI power management information.

FIG. 3 is a flowchart illustrating operations in one embodiment of a method to initialize a memory buffer with ACPI power management information. In one embodiment the operations of FIG. 3 may be implemented by the BIOS 158, alone or in combination with the ACPI BIOS 154, when the computing system 100 is booted, e.g., during power-on-self-test (POST) processing. The BIOS 154 may implement operating instructions to configure the memory buffer 158 in memory managed by the BIOS. In one embodiment, the memory buffer 158 may be configured to include fields to record bus identifiers, device identifiers and functions, and one or more flags that may be used to identify states associated with PCI devices.

Referring to FIG. 3, during POST processing at operation 310 the BIOS scans the PCI bus, and at operation 315 the BIOS locates PCI Express devices connected to the PCI bus. In one embodiment, PCI Express devices may be compatible with Plug-n-Play standards. The BIOS may detect communication between PCI Express devices coupled to the computer system 100.

At operation 320 the BIOS 154 configures PCI Express devices to operate with computer system 100. Operation 320 may be performed in accord with conventional BIOS POST processing. In one embodiment, configuring PCI Express devices may include collecting information from one or more PCI Express devices and enabling active state power management (ASPM) capabilities for one or more detected PCI Express links that are capable of supporting ASPM.

At operation 325 PCI Express information developed by BIOS 154 during POST processing is recorded in memory buffer 158. In one embodiment, ASPM state information for each PCI Express link is recorded in memory buffer 158. ASPM state information may include a bus identifier, a device identifier, and a function identifier, and one or more flags to identify configuration information for the PCI Express device. The PCI Express information may be recorded in memory buffer 158, along with an offset that identifies a memory location.

At operation 330, device capability information developed by BIOS 154 during POST processing is recorded in memory buffer 158. In one embodiment, BIOS 154 generates a pointer to the virtual channel extended capability for one or more PCI Express devices discovered during POST processing. The pointer may be stored in a suitable memory register, and, at operation, 330 the pointer may be stored in the memory buffer 158 and associated with the PCI Express information stored in operation 325.

At operation 335 Extended Capability information discovered by BIOS 154 during POST processing is recorded in memory buffer 158. In one embodiment, BIOS 154 queries the device capability structure to determine whether the Extended Tag field is supported. If the Extended Tag field is supported, then the Extend Tag field (or a pointer to the field) may be stored in the memory buffer 158 and associated with the PCI Express information stored in operation 325.

At operation 340 BIOS 154 finishes POST processing, and at operation 345 BIOS 154 passes control of the computer system 100 to operating system 140. The computer system 100 may operate pursuant to normal operating procedures. Computer system 100 may, at some point in time, enter a sleeps state such as an S2 or S3 sleep state.

Figure 4:
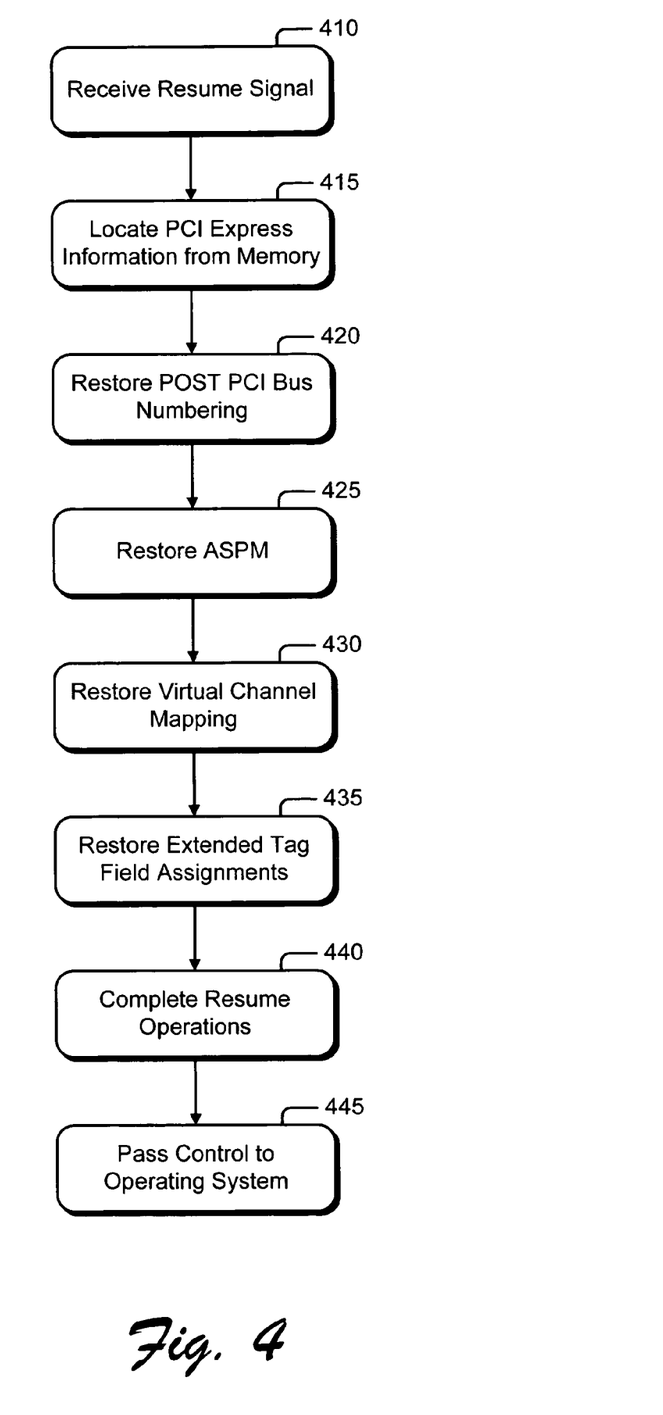
FIG. 4 is a flowchart illustrating operations in one embodiment of a method to resume operations from a sleep state.

FIG. 4 is a flowchart illustrating operations in one embodiment of a method to resume operations from a sleep state such as an S2 or an S3 sleep state. Referring to FIG. 4, at operation 410 BIOS 154 receives a resume signal. In one embodiment a resume signal may be generated as a result of an interrupt from an input/output device such as, e.g., a keyboard or a mouse.

At operation 415 BIOS 154 retrieves PCI Express information from memory buffer 158. In one embodiment, BIOS 154 locates the PCI Express configuration information stored in the memory buffer 158 during POST processing. At operation 420 BIOS 154 uses the bus identifier and device identifier information in memory buffer 158 to restore into active memory the PCI bus numbering scheme implemented during POST processing. At operation 425 BIOS 154 restores into active memory the ASPM state associated with each PCI Express link.

At operation 430 BIOS 154 restores the virtual class mapping for the system using the virtual class mapping information stored in the memory buffer 158 during POST processing. In one embodiment, restoring the virtual channel mapping comprises establishing multiple virtual communication channels for devices that support virtual channels.

At operation 435 BIOS 154 restores the extend tag field assignments using the tag field assignments stored in memory buffer 158 during POST processing. At operation 440 BIOS 154 completes remaining resume operations, and at operation 445 BIOS 154 passes control of computer system 100 to operating system 140.

Figure 5:
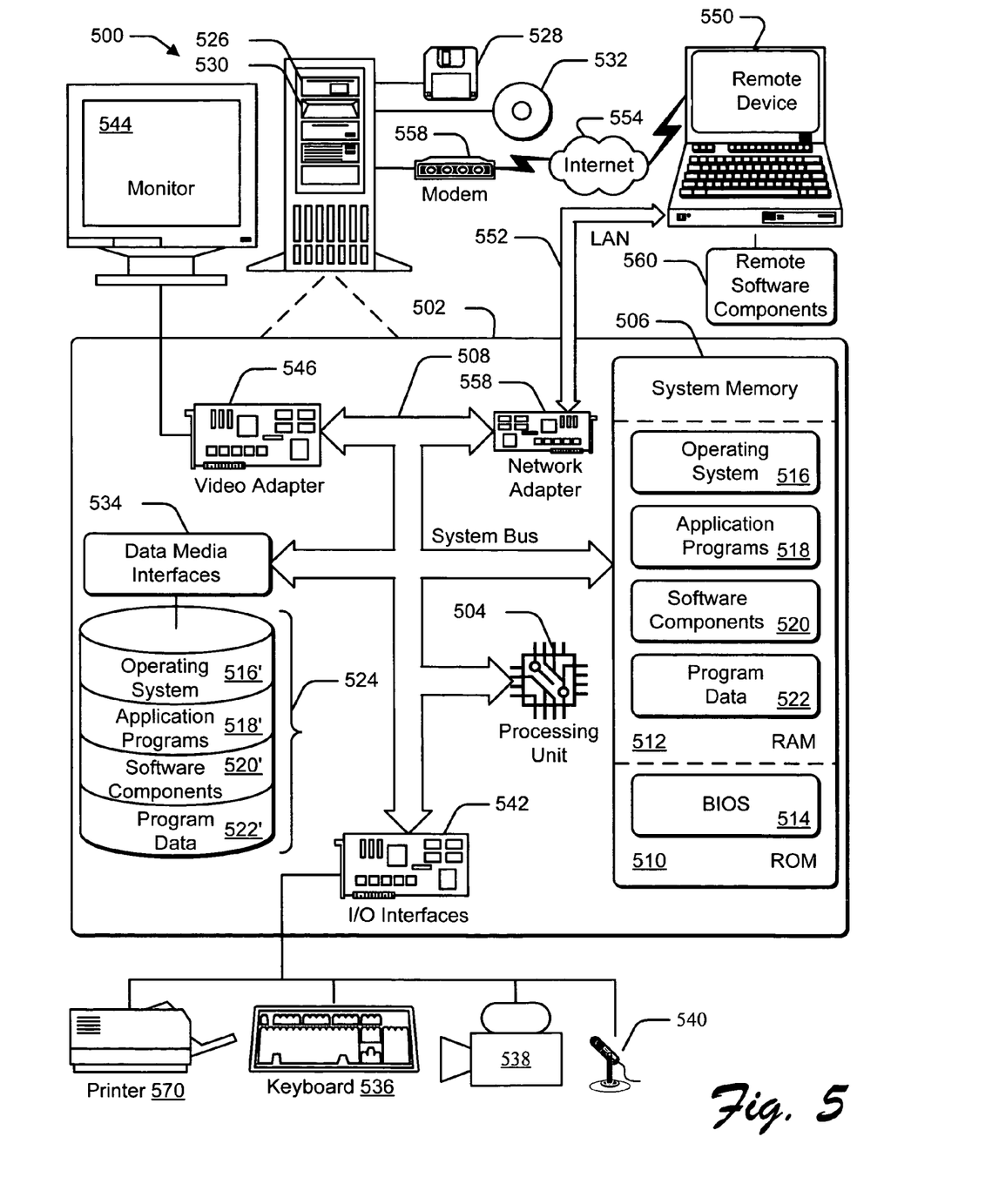
FIG. 5 is a schematic illustration of one embodiment of a computing environment.

FIG. 5 is a schematic illustration of one embodiment of a computing environment. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 500 may include, but are not limited to, a processing unit 504, a system memory 506, and a system bus 508 that couples various system components including the system memory 506 to the processing unit 504. The system bus 508 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus, and PCI Express (PCIE).

Computer 500 typically includes a variety of computer-readable media. Computer-readable media can be any available media that can be accessed by computer 500 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network, fiber optic networks, or direct-wired connection and wireless media such as acoustic, RF, infrared and other wireless media. Combinations of any of the above should also be included within the scope of computer readable media.

The system memory 506 includes computer storage media in the form of volatile and/or nonvolatile memory such as read only memory (ROM) 510 and random access memory (RAM) 512. A basic input/output system 514 (BIOS), containing the basic routines that help to transfer information between elements within computer 500, such as during startup, is typically stored in ROM 510. RAM 512 typically contains data and/or program modules that are immediately accessible to and/or presently being operated on by processing unit 504. By way of example, and not limitation, FIG. 5 illustrates operating system 516, application programs 518, other software components 520, and program data 522.

The computer 500 may also include other removable/non-removable, volatile/nonvolatile computer storage media. By way of example only, the computer system of FIG. 5 may include a hard disk drive 524 that reads from or writes to non-removable, nonvolatile magnetic media, a magnetic disk drive 526 that reads from or writes to a removable, nonvolatile magnetic disk 528, and an optical disk drive 530 that reads from or writes to a removable, nonvolatile optical disk 532 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 524 is typically connected to the system bus 508 through a non-removable memory interface such as data media interface 534, and magnetic disk drive 526 and optical disk drive 530 are typically connected to the system bus 508 by a removable memory interface.

The drives and their associated computer storage media discussed above and illustrated in FIG. 5 provide storage of computer-readable instructions, data structures, program modules, and other data for computer 500. In FIG. 5, for example, hard disk drive 524 is illustrated as storing operating system 516', application programs 518', software components 520', and program data 522'. Note that these components can either be the same as or different from operating system 516, application programs 518, software components 520, and program data 522. Operating system 516, application programs 518, other program modules 520, and program data 522 are given different numbers here to illustrate that, at a minimum, they are different copies. A user may enter commands and information into the computer 500 through input devices such as a keyboard 536 and pointing device 538, commonly referred to as a mouse, trackball, or touch pad. Other input devices (not shown) may include a microphone 540, joystick, game pad, satellite dish, scanner, or the like. These and other input devices are often connected to the processing unit 504 through an input/output (I/O) interface 542 that is coupled to the system bus, but may be connected by other interface and bus structures, such as a parallel port, game port, or a universal serial bus (USB). A monitor 544 or other type of display device is also connected to the system bus 506 via an interface, such as a video adapter 546. In addition to the monitor 544, computers may also include other peripheral output devices (e.g., speakers) and one or more printers 570, which may be connected through the I/O interface 542.

The computer may operate in a networked environment using logical connections to one or more remote computers, such as a remote computing device 550. The remote computing device 550 may be a personal computer, a server, a router, a network PC, a peer device or other common network node, and typically includes many or all of the elements described above relative to computer 500. The logical connections depicted in FIG. 5 include a local area network (LAN) 552 and a wide area network (WAN) 554. Although the WAN 554 shown in FIG. 5 is the Internet, the WAN 554 may also include other networks. Such networking environments are commonplace in offices, enterprise-wide computer networks, intranets, and the like.

When used in a LAN networking environment, the computer 500 is connected to the LAN 552 through a network interface or adapter 556. When used in a WAN networking environment, the computer 500 typically includes a modem 558 or other means for establishing communications over the Internet 554. The modem 558, which may be internal or external, may be connected to the system bus 506 via the I/O interface 542, or other appropriate mechanism. In a networked environment, program modules depicted relative to the computer 500, or portions thereof, may be stored in the remote computing device 550. By way of example, and not limitation, FIG. 5 illustrates remote application programs 560 as residing on remote computing device 550. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method, comprising:
   collecting device configuration information during an initialization process in a computing device; and
   using the device configuration information to restore the computing device from a low-power mode to an operational mode, wherein collecting device configuration information during an initialization process in a computing device comprises:
  initiating power-on-self-test (POST) processing in a basic input/output system (BIOS); and
  collecting peripheral component interconnect express (PCIE) information from one or more devices connected to the computing device; and
  storing the PCIE information in a memory buffer managed by the BIOS; and
wherein using the device configuration information to restore the computing device from a low-power mode to an operational mode comprises:
  activating a state power management feature for one or more PCI Express devices based on the stored device configuration information;
  initializing virtual channel traffic classes for said one or more PCI Express devices; and
  programming extended tag field assignments for said one or more PCI Express devices.

2. The method of claim 1, wherein the PCIE information comprises:
  a bus identifier;
  a device identifier;
  a function identifier;
  an offset value; and
  one or more flags to identify configuration information for a device.

3. The method of claim 1, wherein using the device configuration information to restore the computing device from a low-power mode to an operational mode comprises restoring a PCI Express bus number assigned to one or more PCI Express devices during POST processing.

4. The method of claim 1, further comprising returning control of operations of the computing device to an operating system.

5. A computer system, comprising:
  a processor;
  a memory module including logic instructions which, when executed by the processor, configure the processor to:
  initiate a power-on-self-test (POST) processing in a basic input/output system (BIOS); and
  collect device configuration information including peripheral component interconnect express (PCIE) information from one or more devices connected to the computing device; and
  store the PCIE information in a memory buffer managed by the BIOS;
  activate a state power management feature for one or more PCI Express devices based on the said device configuration information;
  initialize virtual channel traffic classes for said one or more PCI Express devices; and
  program extended tag field assignments for said one or more PCI Express devices.

6. The computer system of claim 5, wherein the PCIE information comprises:
  a bus identifier;
  a device identifier;
  a function identifier;
  an offset value; and
  one or more flags to identify configuration information for a device.

7. The computer system of claim 5, further comprising logic instructions which, when executed by the processor, configure the processor to restore a PCI Express bus number assigned to one or more PCI Express devices during POST processing.

8. The computer system of claim 5, further comprising logic instructions which, when executed by the processor, configure the processor to return control of operations of the computing device to an operating system.

9. A computer program product comprising logic instructions stored on a computer-readable medium which, when executed by a computer processor, configure the processor to:
  initiate a power-on-self-test (POST) processing in a basic input/output system (BIOS); and
  collect device configuration information including peripheral component interconnect express (PCIE) information from one or more devices connected to the computing device; and
  store the PCIE information in a memory buffer managed by the BIOS;
  activate a state power management feature for one or more PCI Express devices based on the said device configuration information;
  initialize virtual channel traffic classes for said one or more PCI Express devices; and
  program extended tag field assignments for said one or more PCI Express devices.

10. The computer program product of claim 9, wherein the PCIE information comprises:
  a bus identifier;
  a device identifier;
  a function identifier;
  an offset value; and
  one or more flags to identify configuration information for a device.

11. The computer program product of claim 9, further comprising logic instructions which, when executed by the processor, configure the processor to restore a PCI Express bus number assigned to one or more PCI Express devices during POST processing.

12. The computer program product of claim 9, further comprising logic instructions which, when executed by the processor, configure the processor to return control of operations of the computing device to an operating system.

* * * * *